Sept. 29, 1953     E. L. ALLEN ET AL     2,653,327
ARTIFICIAL EYE AND IMPLANT

Filed May 21, 1951     2 Sheets-Sheet 1

INVENTORS
JAMES H. ALLEN
EDWIN LEE ALLEN
BY
Williamson,
Williamson
ATTORNEYS

Sept. 29, 1953  E. L. ALLEN ET AL  2,653,327
ARTIFICIAL EYE AND IMPLANT
Filed May 21, 1951  2 Sheets-Sheet 2

INVENTORS
JAMES H. ALLEN
EDWIN LEE ALLEN
BY
ATTORNEYS

Patented Sept. 29, 1953

2,653,327

UNITED STATES PATENT OFFICE 2,653,327

ARTIFICIAL EYE AND IMPLANT

Edwin Lee Allen, Iowa City, Iowa, and
James H. Allen, New Orleans, La.

Application May 21, 1951, Serial No. 227,452

4 Claims. (Cl. 3—13)

This invention relates to artificial or prosthetic eyes and particularly, to the production of a scientific and highly efficient implant for connection with the extraocular muscles of the patient and for support and mounting of the prosthesis to cause the artificial eye to move in harmony with the remaining natural eye of the patient.

While scientific progress has been made in the development of artificial eye implants and in techniques for suturing the cut ends of the rectus muscles after removal of the natural eye ball, the results prior to our discovery have not been satisfactory for several reasons. First, the structures of implants produced heretofore and their connections with the prosthesis have produced tension upon either the rectus muscles or upon Tenon's capsule and the conjunctiva and in some instances have required the leaving of an opening through the conjunctiva for connection of the prosthesis with the implant resulting in many instances in infection or persistent discharge after use by the patient for a few months. In other instances, where the horizontal and vertical rectus muscles after cutting, were sutured to form a muscle cone, the connection of implant and prosthesis was inefficient, often permitting relative rotation between the prosthesis and implant and failing to obtain the lifelike mobility of the prosthesis in harmony with the remaining natural eye. Methods and techniques developed where a specially constructed hollow prosthesis was utilized and the sutured muscle cone countersunk in the posterior of the prosthesis and secured thereto, were found unsatisfactory because the prosthetic eye did not immediately respond in movement to the resultant movement of the rectus muscles; did not provide for adequate leverage to be applied to the prosthesis and usually, produced tension upon the rectus muscles or the conjunctiva and Tenon's capsule through impingement upon facial tissues.

It is an object of our invention to provide a simple, scientific and highly efficient implant for a prosthetic eye which provides tunnel-like spaces and recesses for accommodation and burying of the muscle cone produced by junctures of the cut muscles; which overcomes the objections to implants and techniques heretofore utilized and provides for a lifelike mobility of the artificial eye in harmony with the remaining natural eye.

A further object is the provision of a buried muscle cone implant which is substantially hemispherical in shape and which permits the conjunctiva and Tenon's capsule to be fully closed after the implant is applied.

A further object is the provision of an implant of the class described wherein conjunctiva and Tenons' capsule covering the implant are caused to rest upon a bed of tissue to which the same may become firmly adherent while nevertheless providing a relatively large diameter leverage-applying member at the anterior of the implant for directly and very efficiently applying immediate movement to the prosthesis.

The foregoing and other objects and advantages of our invention will more fully appear from the following description made in connection with the accompanying drawings wherein like reference characters refer to similar parts throughout the several views and in which.

Figure 1:
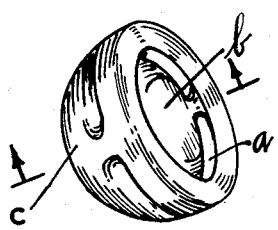
Fig. 1 is a side and partially front perspective view of one of our implants of preferred form.
Figure 3:
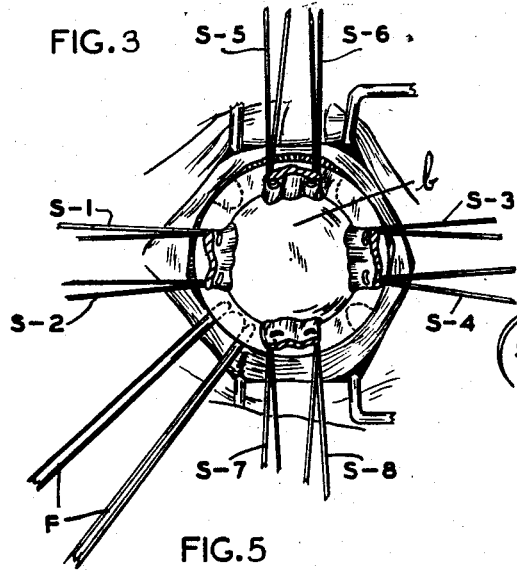
Fig. 3 is a front view showing our implant held by a pair of forceps F above the muscle cone with the spherical surface of the implant toward the apex of the muscle cone and with both sutures from each rectus muscle passed through the appropriate tunnels from the peripheral end towards the center of the anterior surface of the implant and laid aside.
Figure 2:
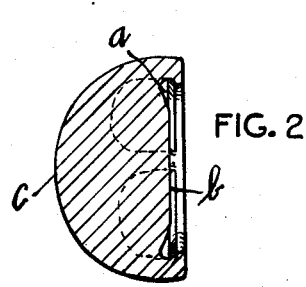
Fig. 2 is a vertical mid section taken substantially along the line 3—3 of Fig. 1.

Referring now to the preferred embodiment of our invention illustrated, our implant is basically a hemisphere (not particularly the dotted lines in Figure 3) and we prefer a construction to utilize a diameter of substantially 21 mm. with a dimension approximating 11 mm. from the anterior surface to the posterior pole or axis. An opening or recess $b$ as shown of 1½ mm. in depth and 15 mm. in diameter, is centered in the anterior surface. Four tunnels or muscle-accommodating passages $a$ as illustrated of 1 mm. in height and 9 mm. in width, extend backward radially through the body of the implant from the periphery of the recess or opening $b$. The tunnels are rounded gently onto the posterior spherical surface $c$. Each of these tunnels in use retains one of the four rectus muscles as the muscle passes through from the side of the spherical surface into the recess of the opening in the anterior surface where it is overlapped and sutured to its opponent. The implants are preferably fabricated from high quality, solid transparent plastics of various types and compositions. We find factory processed methyl methacrylate resin highly satisfactory, among other compositions. Fabrication from methyl methacrylate monomer-polymer preparations is avoided to reduce the possibility of burying volatile remnants, plasticisers or other impurities which might cause eventual extrusion of the implant. Certain of the noncorrosive lighter metals may also be employed.

In use, to obtain the best results, five principal procedures should be followed in the surgical technique:

1. The conjunctiva should be incised close to the limbus.

2. The muscle tendons should be severed as close to the sclera as possible.

3. The muscles should be separated from their fascial attachments for at least 15 mm. posterior to their severed ends.

4. Bleeding should be controlled before the implant is inserted into the muscle cone.

5. The conjunctiva and Tenon's capsule should be closed without tension.

The conjunctiva is incised around the circumference of the cornea at the limbus. The conjunctiva and subconjunctival tissues are elevated, exposing the rectus muscle tendons. A single arm 4-0 catgut suture is placed with a lock stitch enclosing approximately one-third of the width of the muscle through each edge and 1 mm. from the scleral insertion of the four rectus muscles. The tendons are cut as close to the sclera as possible. The optic nerve is severed, the oblique muscles sectioned at their insertions, and the globe delivered in the usual manner. Hemorrhage is controlled by pressure, following which the rectus muscles are separated from all fascial attachments for at least 15 mm. posterior to their free ends.

Figure 4:
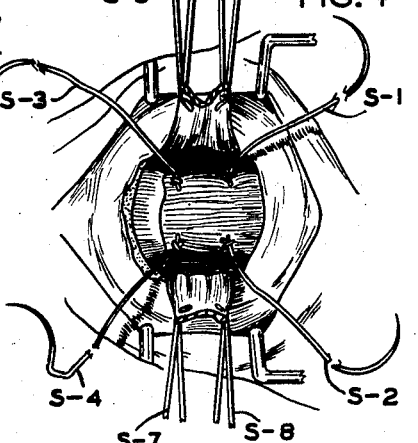
Fig. 4 is a similar view showing the medial rectus and lateral rectus muscles overlapped in the accommodating recess formed in the anterior surface of the implant.

The implant (see Fig. 3) is held by a pair of smooth forceps F above the muscle cone with the spherical surface of the implant toward the apex of the muscle cone. Both sutures $s$ from each muscle are passed through a tunnel from the peripheral end toward the center of the anterior surface of the implant, laid aside and secured by hemostats. After all the sutures and muscles have been passed through their respective tunnels, the medial rectus and lateral rectus muscles are overlapped (Fig. 4) in the recess $b$ formed by the opening in the center of the anterior surface of the implant. The suture through the upper edge of the medial rectus S-1 is placed through the upper edge of the lateral rectus approximately 5 mm. posterior to the free end and tied. The suture through the lower edge of the medial rectus S-2 is placed through the lower edge of the lateral rectus opposite the upper one and tied. Similarly the sutures from the upper and lower edges of the lateral rectus S-3, S-4 are placed through the corresponding edges of the medial rectus and tied. The free ends of these four sutures are cut but the needle ends are retained for use eventually as tension sutures.

Figure 5:
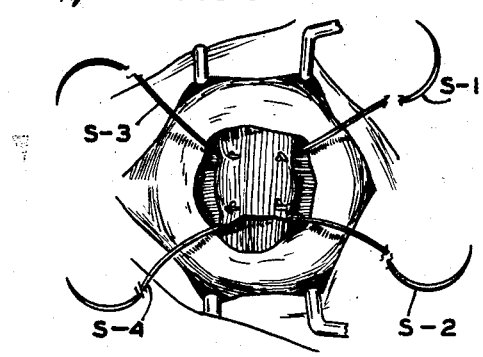
Fig. 5 is a similar view showing the superior and inferior rectus muscles overlapped and secured in the accommodation recess of the anterior surface of the implant and showing the ends of the sutures cut immediately after tying thereof.

The superior and inferior rectus muscles are overlapped (see Fig. 5) and secured in the recess in the anterior surface of the implant in the same manner as the medial and lateral rectus muscles, but both ends of the sutures are cut as soon as they are tied.

Figure 6:
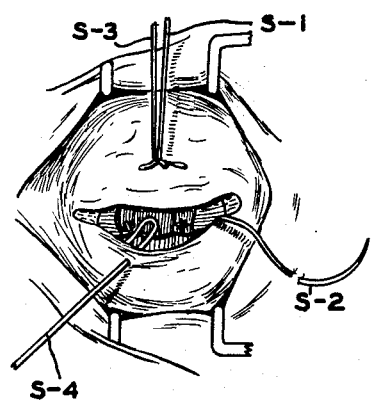
Fig. 6 is a similar view showing the conjunctiva and Tenon's capsule partially restored to natural position and showing the needle ends of the sutures from the upper border of the lateral and medial rectus muscles passed through Tenon's capsule and conjunctiva above and tied.
Figure 7:
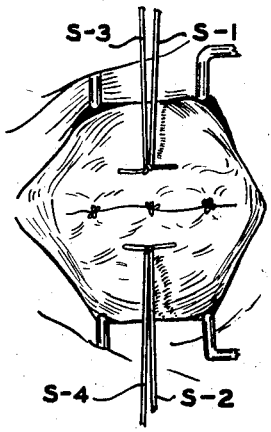
Fig. 7 is a similar view showing the conjunctiva closed and secured by sutures and showing the needle ends of the sutures from the lower border of the lateral and medial rectus muscles passed through Tenon's capsule and conjunctiva and tied.

The needle ends of the sutures, from the upper border of the lateral and medial rectus muscles S-1, S-3 are passed through Tenon's capsule and conjunctiva above and tied (see Fig. 6). Similarly, the remaining ends of the sutures, from the lower edges of the lateral and medial rectus muscles S-2, S-4 are passed through Tenon's capsule and through conjunctiva below and tied. These sutures are placed so the edges of the conjunctiva and Tenon's capsule come together without tension. The conjunctiva then is closed in a horizontal line by 3 or 4 interrupted 4-0 catgut sutures (Fig. 7). The tension sutures are then cut.

Our hemispherical implant is basically the same shape and only very slightly less in volume than the posterior half of the enucleated eye. It cannot become displaced in the muscle cone unless there is separation of muscle tissue.

Figure 8:
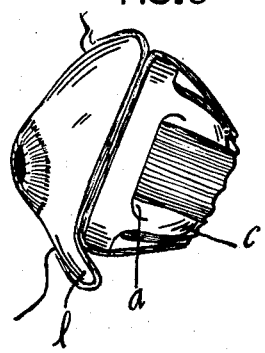
Fig. 8 is a diagrammatical combination view showing plastic eye or prosthesis in its relation to the implant socket and caruncle.

It will be noted (see particularly Figs. 5, 6 and 8) that the sutured ends of the two sets of overlapped muscles in the opening or recess be of our implant substantially fill that recess to the end that the conjunctiva and Tenon's capsule covering the implant as shown in Fig. 8 actually rest upon a bed of tissue to which they become firmly adherent.

*The prosthesis*

Figure 9:
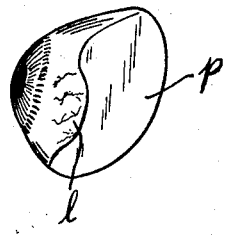
Fig. 9 is a perspective view taken mainly from the posterior showing the substantially flat posterior surface and the nasal extremity of the plastic eye and a portion of the usually protruding anterior portion.

Approximately one month after the operation, the prosthetic eye is prepared and fitted to the socket. Our invention contemplates the combination of a specially constructed prosthetic eye with our specific implant. The prosthesis is illustrated in Figs. 8 and 9 of the drawings and as clearly shown, has a quite substantial flat posterior surface $p$ and a thin lip L which usually extends nasally to fit behind the caruncle and around the anterior edge of the implant, to be seen when eye is rotated temporally. In a few instances it is desirable that all lips or protrusions from the posterior surface be eliminated, and in rare cases it is desirable to have a lip temporally disposed of the prosthesis. A custom made plastic eye is preferred although a stock prosthesis may be used with a special fitting procedure and successful results attained. Without such special fitting procedure, there is a danger of pressure necrosis from high points on the back of the scleral segment. The scleral portion of a stock plastic eye should be as large as possible to permit shaping thereof to fit the socket and to enable a flat surface to be formed for receiving the conjunctiva overlying the implant. The fitting process consists merely in grinding the back of the stock plastic eye to a flat surface with slightly rounded edges, usually leaving the short lip extending nasally and thereafter buffing the reworked surfaces.

Stock plastic eyes which are too small to be handled as above recited may be filled out to the proper enlarged size and shape by adding dental inlay wax to the posterior surface. When the fitting has been completed in this manner, a mold is prepared, the wax removed and plastic material added to the stock eye in the mold.

From the foregoing description, it will be seen that with our improved implant the several rectus muscles are formed into a crossed, sling-like support while the tunnels or passages $c$ prevent the muscles from slipping from the anterior surface of the implant. Substantially the greatest leverage possible is imparted from the relatively large ring at the anterior of the implant through the peripheral edges thereof. The broad, flat surfaces of contact between the anterior of the implant and the prosthesis prevent any substantial compression of Tenon's capsule and conjunctiva. Furthermore, since there is no curved surface of connector or motion-transmitting parts one surface cannot rotate around nor within the other as in a ball and socket joint. As heretofore stated, the enlarged central opening or recess $b$ allows the conjunctiva and Tenon's capsule which covers the implant to rest upon a bed of tissue.

The resultant combination of implant and prosthetic eye has rapid and immediate movement.

The contours of the plastic eye, eyelids and surrounding tissues are of importance to the total cosmetic appearance of the eye. Our buried hemisphere implant is basically the same shape as the posterior half of the enucleated eye. It cannot become displaced in the muscle cone unless there is separation of muscle tissue. The prosthetic eye is much like the anterior half of the enucleated eye. The combination forms a satisfactory substitute both in size and weight. In most cases, the prosthetic eye with our implant will have a nearly normal prominence; vertical and horizontal positioning. The superior palpebral fold of the upper lid will present an almost normal appearance.

The implant is completely covered by conjunctiva and Tenon's capsule. Danger of extrusion is minimized. Infectious agents cannot pass readily into the cavity occupied by the implant. The tissue in the vicinity of the muscle cone are support in a manner which assures a satisfactory cosmetic effect.

Figure 10:
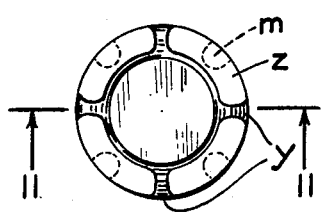
Fig. 10 is a front elevational view of a somewhat different form of implant.
Figure 11:
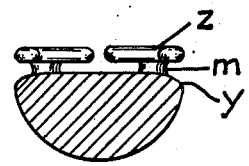
Fig. 11 is a cross section taken on the line 11—11 of Fig. 10.

In Figs. 10 and 11 of the drawings, a somewhat different form of our implant is illustrated, wherein the sutures and rectus muscles do not need to be threaded or passed through apertures in the peripheral forward portion of the implant.

The implant, as shown in Figs. 10 and 11, is of the general size and shape of the form first described but employs instead of tunnel passages, muscle accommodating passages X which are formed as relatively wide grooves in the anterior of the implant body. The passages X are formed by channeling or grooving the anterior surface to form an overall recess of cross shape through the intersection of a pair of relatively wide intersecting grooves. The passages or grooves X round gently into the semi-spherical peripheral and posterior construction of the implant, as shown in Fig. 11.

In use of this last described implant, the two sets of vertical and lateral rectus muscles are sutured and the ends drawn together across the center of the recessed anterior of the implant. The width of these muscles substantially fills the recess of the respective passages X and the juncture of the two severed ends (lateral and vertical muscles) is made at the medial portion of the cross-shaped recess.

From the foregoing description, it will be seen that we have provided an implant for a prosthetic eye as well as a combination of implant and prosthetic eye which provides for accommodation and substantial burying of the muscle cone produced by juncture of the cut horizontal and vertical rectus muscles and which provides a life-like mobility of the artificial eye in strict harmony with the remaining natural eye. Further, it will be seen that with our structure, conjunctiva and Tenon's capsule may be fully closed after the implant is applied.

It will of course be understood that various changes may be made in the form, details, arrangement and proportions of the parts without departing from the scope of our invention.

What we claim is:

1. In a muscle-actuated replacement for an enucleated human eye, an implant of substantially hemi-spherical shape having a smooth spherical surface providing for free turning thereof in the human orbit, said implant further having a substantially planar annular anterior surface, the outside diameter of which surface is substantially equal to the diameter of said implant and the inside diameter of which defines an opening, a muscle-end and suture-accommodating recess communicating with the anterior thereof at said opening, a plurality of circumferentially spaced passages communicating with said recess and with the exterior of said implant spherical surface adjacent the anterior for receiving therein the cut sutured end portions of the rectus muscles of a natural eye, said implant when positioned in the human socket being adapted to be covered by the conjunctiva and Tenon's capsule so that the anterior surface of the implant and the conjunctiva and Tenon's capsule provide a substantially planar surface against which a prosthesis can be abutted for conjoint non-slipping movement therewith.

2. In a muscle-actuated replacement for an enucleated human eye according to claim 1 wherein said annular anterior surface is continuous.

3. In a muscle-actuated replacement for an enucleated human eye according to claim 1 wherein said annular anterior surface is discontinuous providing a plurality of openings in the anterior surface corresponding in number with said passages and communicating with said passages so that the rectus muscles can be passed through the openings into their respective passage.

4. In a muscle-actuated replacement for an enucleated human eye, an implant of substantially hemispherical shape having a smooth spherical surface providing for free turning thereof in the human orbit, said implant further having a substantially planar annular anterior surface, the outside diameter of which surface is substantially equal to the diameter of said implant and the inside diameter of which defines an opening, a muscle-end and suture-accommodating recess communicating with the anterior thereof at said opening, a plurality of circumferentially spaced passages communicating with said recess and with the exterior of said implant spherial surface adjacent the anterior for receiving therein the cut sutured end portions of the rectus muscles of a natural eye, said implant having a size approximating the volume of the posterior half of the enucleated eye, and the portions of the implant defining said passages and recess being gently rounded so that the surfaces contacted by the muscles are substantially free of abrupt changes in curvature, said implant when positioned in the human socket being adapted to be covered by the conjunctiva and Tenon's capsule so that the anterior surface of the implant and the conjunctiva and Tenon's capsule provide a substantially planar surface against which a prosthesis can be abutted for conjoint non-slipping movement therewith.

EDWIN LEE ALLEN.
JAMES H. ALLEN.

References Cited in the file of this patent

UNITED STATES PATENTS

| Number | Name | Date |
|---|---|---|
| 1,993,121 | Travers | Mar. 5, 1935 |
| 2,466,780 | Radin | Apr. 12, 1949 |
| 2,574,750 | Moore | Nov. 13, 1951 |

OTHER REFERENCES

An article from "British Journal of Ophthalmology," vol. 28, Nov. 1944, pp. 573 and 574. "Plastic Spheres For Implantation Into Tenon's Capsule In the Frost-Lang Type Operation For Enucleation of the Eyeball" by R. E. Wright. (A copy is in the Army Medical Library, Washington, D. C.)

An article from "American Journal of Ophthalmology," vol. 32, No. 7, July 1949, pp. 990, 991, 992. "A New Orbital Implant" by O. H. Ellis. (A copy is in the Scientific Library of the Patent Office.)